(12) United States Patent
Byrd et al.

(10) Patent No.: US 7,193,798 B2
(45) Date of Patent: Mar. 20, 2007

(54) METHOD AND APPARATUS FOR ENCODING AND DECODING A RUNOUT CORRECTION BIT PATTERN OF SERVO FIELD

(75) Inventors: James Byrd, Berthoud, CO (US); Walter Allen, Wellington, CO (US)

(73) Assignee: Agere Systems, Inc., Allentown, PA (US)

( * ) Notice: Subject to any disclaimer, the term of this patent is extended or adjusted under 35 U.S.C. 154(b) by 18 days.

(21) Appl. No.: 11/034,133

(22) Filed: Jan. 12, 2005

(65) Prior Publication Data

US 2006/0152836 A1    Jul. 13, 2006

(51) Int. Cl.
*G11B 5/09* (2006.01)
(52) U.S. Cl. .................................................... 360/39
(58) Field of Classification Search ................ 360/39, 360/75, 48, 77.04, 77.07, 78.09, 60; 375/319, 375/340
See application file for complete search history.

(56) References Cited

U.S. PATENT DOCUMENTS

| | | | |
|---|---|---|---|
| 5,793,559 A * | 8/1998 | Shepherd et al. ........ 360/78.09 |
| 6,061,200 A * | 5/2000 | Shepherd et al. ........ 360/77.04 |
| 6,765,748 B2 * | 7/2004 | Shu ........................... 360/77.04 |
| 6,912,099 B2 * | 6/2005 | Annampedu et al. .......... 360/39 |
| 6,965,491 B1 * | 11/2005 | Perlmutter et al. ....... 360/77.04 |
| 6,977,792 B1 * | 12/2005 | Melrose et al. ................ 360/75 |
| 7,002,767 B2 * | 2/2006 | Annampedu et al. .......... 360/75 |
| 2002/0196576 A1 * | 12/2002 | Hirano et al. ............. 360/77.07 |
| 2004/0136477 A1 * | 7/2004 | Annampedu et al. ........ 375/340 |
| 2004/0190646 A1 * | 9/2004 | Aziz ............................ 375/319 |
| 2005/0057837 A1 * | 3/2005 | Takamatsu et al. ............ 360/48 |
| 2005/0094307 A1 * | 5/2005 | Iwashiro ................... 360/77.04 |
| 2005/0099720 A1 * | 5/2005 | Chung et al. .................. 360/75 |
| 2005/0190480 A1 * | 9/2005 | Mori et al. ..................... 360/60 |

\* cited by examiner

*Primary Examiner*—Fred F. Tzeng

(57) ABSTRACT

One or more bits are added to the embedded repeatable runout correction (ERRC) bit pattern of a servo field so that errors in ERRC bit patterns can be detected and in certain cases corrected. If four bits are added, a single bit error in an ERRC bit pattern can be detected and corrected. If five bits are added, two bit errors in the ERRC bit pattern can be detected. In accordance with the preferred embodiment, the invention uses a single encode table and a single decode table to encode the ERRC pattern to be written to the disk and to decode the ERRC pattern read back from the disk.

14 Claims, 4 Drawing Sheets

METHOD AND APPARATUS FOR ENCODING AND DECODING A RUNOUT CORRECTION BIT PATTERN OF SERVO FIELD

TECHNICAL FIELD OF THE INVENTION

The invention relates to a read/write head system of a disk drive digital storage system. More particularly, the invention relates to a method and apparatus for encoding and decoding an embedded repeatable runout correction (ERRC) bit pattern of a servo field stored on a magnetic disk of a disk drive storage system to enable one or more errors in the ERRC bit pattern to be detected, and in certain cases, corrected.

BACKGROUND OF THE INVENTION

A typical magnetic disk drive digital storage system includes a read/write head system that controls the reading of information from and the writing of information to the magnetic disk. A servo circuit of the read/write head system controls the positioning of a read/write head relative to the disk when reading information from and writing information to the disk.

Prior to shipment of a disk drive digital storage system, a servo field is written on the disk in the factory. During normal read/write operations, the servo circuit analyzes the servo field and moves the read/write head so that it is positioned correctly in the center of the disk track to be read or written.

As a disk spins, it wobbles to some extent. This wobble is commonly referred to as track mis-registration. A predictable wobble is commonly referred to as repeatable runout. In order to correct for this repeatable runout, the extent of repeatable runout is measured in the factory and an embedded repeatable runout correction (ERRC) bit pattern is written to the disk as part of the servo field. During normal operations, the servo circuit analyzes the ERRC bit pattern read from the disk and moves the read/write head by an amount indicated by the ERRC bit pattern to correct for wobble and ensure that the read/write head is centered on the track it is reading or writing.

Although the addition of the ERRC bit pattern to the servo field provides an improvement to servo track following, a problem still exists in that an error in the ERRC bit pattern can cause the read/write head to be incorrectly positioned. In fact, an error in reading this pattern may introduce more position error than if no attempt was made to correct for the repeatable error. Current servo circuits perform an interrupt service request (ISR) algorithm that determines whether the ERRC value read is a reasonable value. However, even when the ERRC value read is determined to be reasonable, it may still be incorrect and result in the read/write head being moved an incorrect amount and/or in the wrong direction.

Accordingly, a need exists for a method and apparatus for detecting and correcting errors in an ERRC bit pattern of a servo field.

SUMMARY OF THE INVENTION

The invention provides methods and apparatuses for encoding and decoding runout correction bit patterns to enable one or more errors in the bit patterns to be detected, and in some cases, corrected. The apparatus for encoding a runout correction bit pattern comprises encoding logic configured to encode a runout correction bit pattern with a code comprising one or more code bits. The apparatus for decoding a runout correction bit pattern comprises decoding logic configured to decode a runout correction bit pattern read back from a read channel. The method for encoding a runout correction bit pattern comprises performing an encoding algorithm that encodes a runout correction bit pattern with a code comprising one or more code bits. The method for decoding a runout correction bit pattern comprises performing a decoding algorithm that decodes a runout correction bit pattern read back from a read channel.

These and other features and advantages of the invention will become apparent from the following description, drawings and claims.

DETAILED DESCRIPTION OF THE PREFERRED EMBODIMENTS

Figure 1:
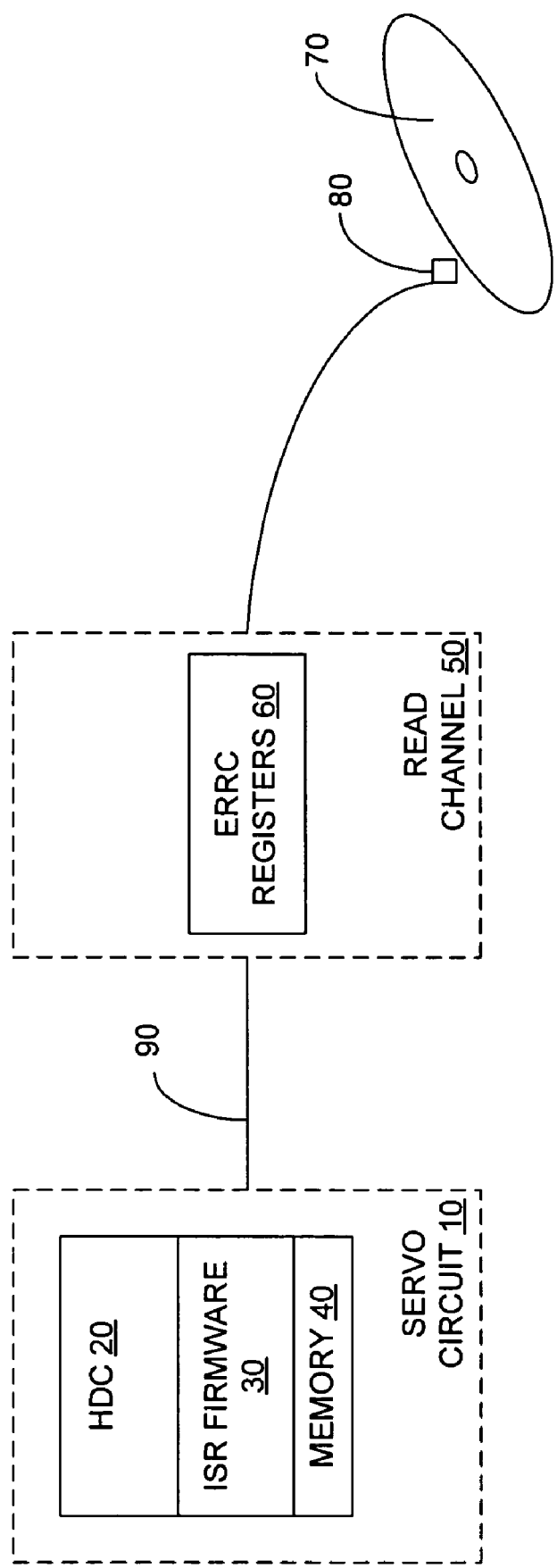
FIG. 1 illustrates a block diagram of the apparatus of the invention in accordance with this exemplary embodiment.

In accordance with the invention, one or more bits are added to the ERRC bit pattern and used for detecting and correcting errors in ERRC bit patterns. Another name for the ERRC bit pattern is the compensated runout algorithm position bit pattern. Errors that occasionally occur in this bit pattern are corrected by the algorithm of the invention, which will be referred to herein as the occasional loss algorithm. Although the invention will be described herein with reference to an ERRC bit pattern, the invention applies to all types of runout correction bit patterns, regardless of what they are termed. The manner in which the invention enables errors in an ERRC bit pattern to be detected will now be described with reference to an example in which four or five bits are added to the ERRC bit pattern.

If four bits are added, a single bit error in the ERRC bit pattern can be detected and corrected. If five bits are added, two bit errors in the ERRC bit pattern can be detected. The example assumes that the ERRC bit pattern is only four bits in length. Typically, the ERRC bit pattern is eight bits in length.

In accordance with the preferred embodiment, the invention uses a single encode table and a single decode table to encode the ERRC pattern to be written to the disk and to decode the ERRC pattern read back from the disk. The encode and decode tables are represented as ENCODE and DECODE columns in Table 1:

TABLE 1

| DATA     | ENCODE | DECODE |
|----------|--------|--------|
| 0(0000b) | 0x00   | 0x00   |
| 1(0001b) | 0x70   | 0x00   |
| 2(0010b) | 0xB0   | 0x00   |
| 3(0011b) | 0xC0   | 0xFF   |
| 4(0100b) | 0xD0   | 0x00   |
| 5(0101b) | 0xA0   | 0xFF   |

TABLE 1-continued

| DATA | ENCODE | DECODE |
|------|--------|--------|
| 6(0110b) | 0x60 | 0xFF |
| 7(0111b) | 0x10 | 0x01 |
| 8(1000b) | 0xE0 | 0x00 |
| 9(1001b) | 0x90 | 0xFF |
| A(1010b) | 0x50 | 0xFF |
| B(1011b) | 0x20 | 0x02 |
| C(1100b) | 0x30 | 0xFF |
| D(1101b) | 0x40 | 0x04 |
| E(1110b) | 0x80 | 0x08 |
| F(1111b) | 0xF0 | 0xFF |

The values listed in the DATA column are binary values, as indicated by the lower case "b" at the end of each number. The values listed in the ENCODE and DECODE columns are in hexadecimal, as indicated by the "0x" suffixes. The values listed in the DATA column correspond to the ERRC bit patterns and the values listed in the ENCODE column correspond to the Hamming code bits that are added to the ERRC bit patterns for error detection and correction. The values in the DECODE column correspond to the Hamming code bits that are used to decode encoded ERRC bit patterns.

In order to encode an ERRC bit pattern, the ERRC bit pattern shown in the DATA column is used to lookup the entry in the ENCODE column that will be used to encode the ERRC bit pattern. For example, an ERRC value of A (1010b) in the DATA column indexes to a Hamming code of 50 (0101 0000) in the ENCODE column. Therefore, to encode the ERRC value of A, it is logically ORed with the Hamming code of 50 obtained from the ENCODE column as follows:

(0101 0000) OR (0000 1010)=0101 1010=5A.

The value of 5A is then written to the ERRC field as the encoded ERRC bit pattern.

When the ERRC bit pattern is read back, it is decoded to obtain the actual correction value to be used to compensate for the repeatable runout. In order to decode the encoded ERRC bit pattern, the four least significant bits in the value read back are used to lookup the corresponding Hamming code in the ENCODE column.

For example, if a value of 5A (0101 1010) was written to the servo field as the encoded ERRC bit pattern and a value of 58 (0101 1000) instead of 5A was erroneously read back, the data value of 8 (1000) is used as an index to the ENCODE column to find the corresponding Hamming code of E0 (1110 0000). The Hamming code obtained from the ENCODE column is then exclusive ORed (XORed) with the value that was read back. In this example, E0 is XORed with 58 to obtain:

(1110 0000) XOR (0101 1000)=1011 1000=B8.

The four most significant bits of the resulting value are then used to index the DECODE column. In this example, the data value of B in the DATA column indexes to the Hamming code of 02 (0000 0010) in the DECODE column. The Hamming code obtained from the DECODE column is then XORed with the value that was read back. In this case, the value of 02 is XORed with the value of 58 to obtain the value that was originally:

(0000 0010) XOR (0101 1000)=0101 1010=5A.

The four least significant bits of the resulting value correspond to the compensation value that the servo circuit will use to correct for the repeatable runout. In this example, the compensation value is A=1010.

The example given above demonstrates that a single bit error in the data bits, i.e., in the ERRC bit pattern prior to encoding, can be detected and corrected by using a four-bit Hamming code to encode the ERRC bit pattern. As stated above, if a five-bit Hamming code is used, a double bit error in the data bits can be detected. The value of 0x00 in the DECODE column indicates that a single bit error occurred in the Hamming code bits used to encode the ERRC pattern and that no correction to the data bits is required. The value of 0xFF in the DECODE column indicates that an uncorrectable double bit error occurred in the encoded ERRC bit pattern. When an error is detected that cannot be corrected, preferably the servo circuit makes no attempt to compensate for repeatable runout.

The encoding and decoding algorithms of the invention described above (i.e., collectively, the occasional loss algorithm) may be implemented in hardware with only a few logic gates, in firmware or in software. In accordance with one exemplary embodiment, the algorithms are implemented in the existing Interrupt Service Request (ISR) firmware of the servo circuit. In accordance with this embodiment, a few additional instructions and two tables are added to existing ISR firmware to enable the encoding and decoding algorithms of the invention to be performed. One table contains the Hamming codes corresponding to the ENCODE column shown in Table 1. The other table contains the Hamming codes corresponding to the DECODE column shown in Table 1.

FIG. 1 illustrates a block diagram of the apparatus of the invention in accordance with this exemplary embodiment. The apparatus includes a servo circuit 10, which includes a hard disk controller 20 programmed with ISR firmware 30. The apparatus also includes ERRC registers 60 of the read channel 50. The ERRC registers 60 store the encoded ERRC values to be written to a hard disk 70 by a read/write head 80 and to store encoded ERRC bit patterns that are read from the hard disk 70 by the read/write head 80. The servo circuit 10 includes a memory device 40 for storing the encoding and decoding tables. The memory device 40 may be part of or separate from the HDC 20. The HDC 20, firmware 30 and memory 40 together comprise encoding and decoding logic for performing the encoding and decoding algorithms described above. The servo circuit 10 communicates with the read channel 50 via a communication interface 90.

Figure 2:
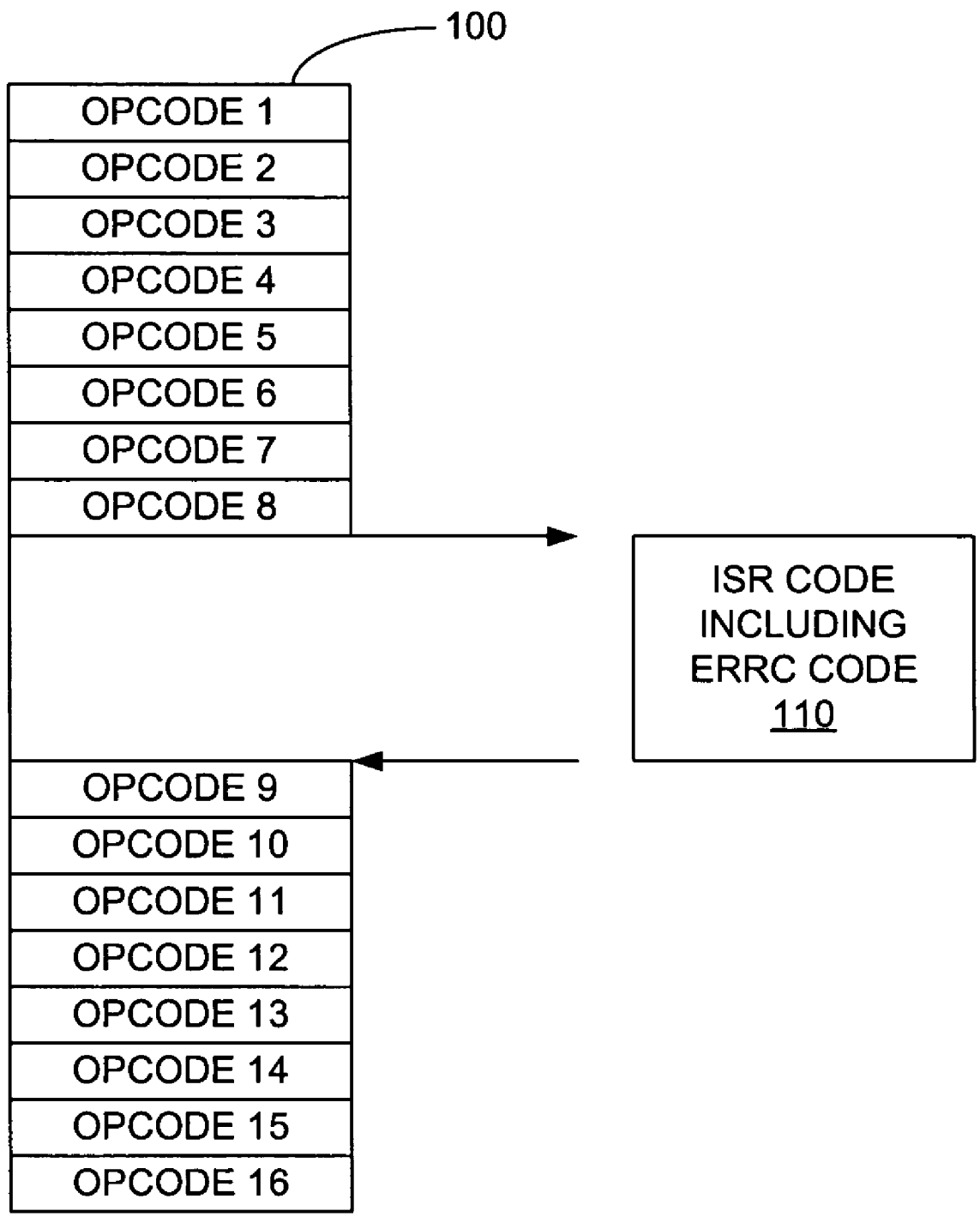
FIG. 2 illustrates a block diagram of memory in which instructions are stored that are executed by the hard disk controller of the servo circuit shown in FIG. 1.

FIG. 2 illustrates a block diagram of memory 100 in which instructions are stored that are executed by the HDC 20 of the servo circuit 10. When an ISR occurs while the HDC 20 is executing instructions, the HDC 20 branches to the ISR routine, which is represented by block of instructions 110. The ISR routine 110 includes the ERRC code that performs the decoding algorithm described above with reference to Table 1. The ISR routine 110 causes the encoded ERRC bit pattern stored in the ERRC registers 60 to be retrieved and decoded by the HDC 20 using the encoding and decoding tables contained in memory device 40 to detect and correct errors in the ERRC data bits. The ISR routine 110 then causes the HDC 20 to forward the correct repeatable runout compensation value to the read channel 50, which uses the compensation value to correctly position the read/write head 80.

Figure 3:
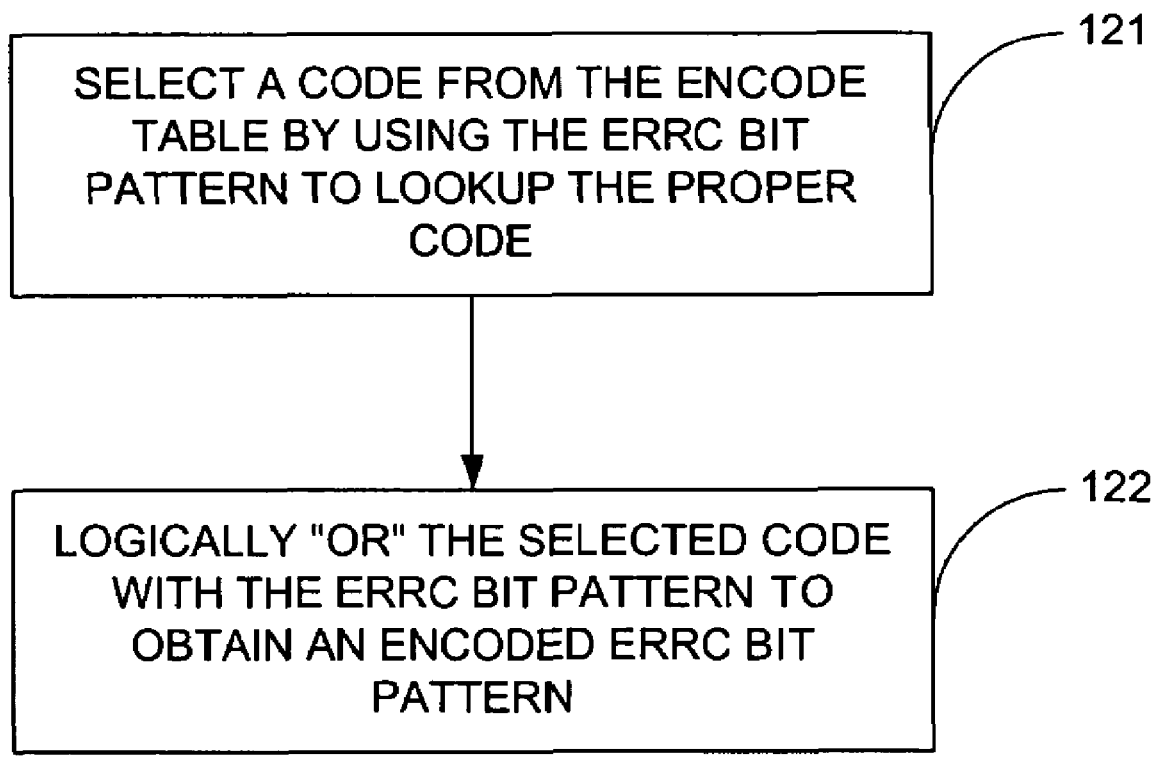
FIG. 3 illustrates a flow chart that represents the method of the invention for encoding an ERRC bit pattern.

FIG. 3 illustrates a flow chart that represents the method of the invention for encoding an ERRC bit pattern. The method is performed by executing a encoding algorithm that encodes the ERRC bit pattern with one or more code bits, as indicated by block 120. As indicated above, the encoding algorithm may be performed in hardware, software or firmware.

Figure 4:
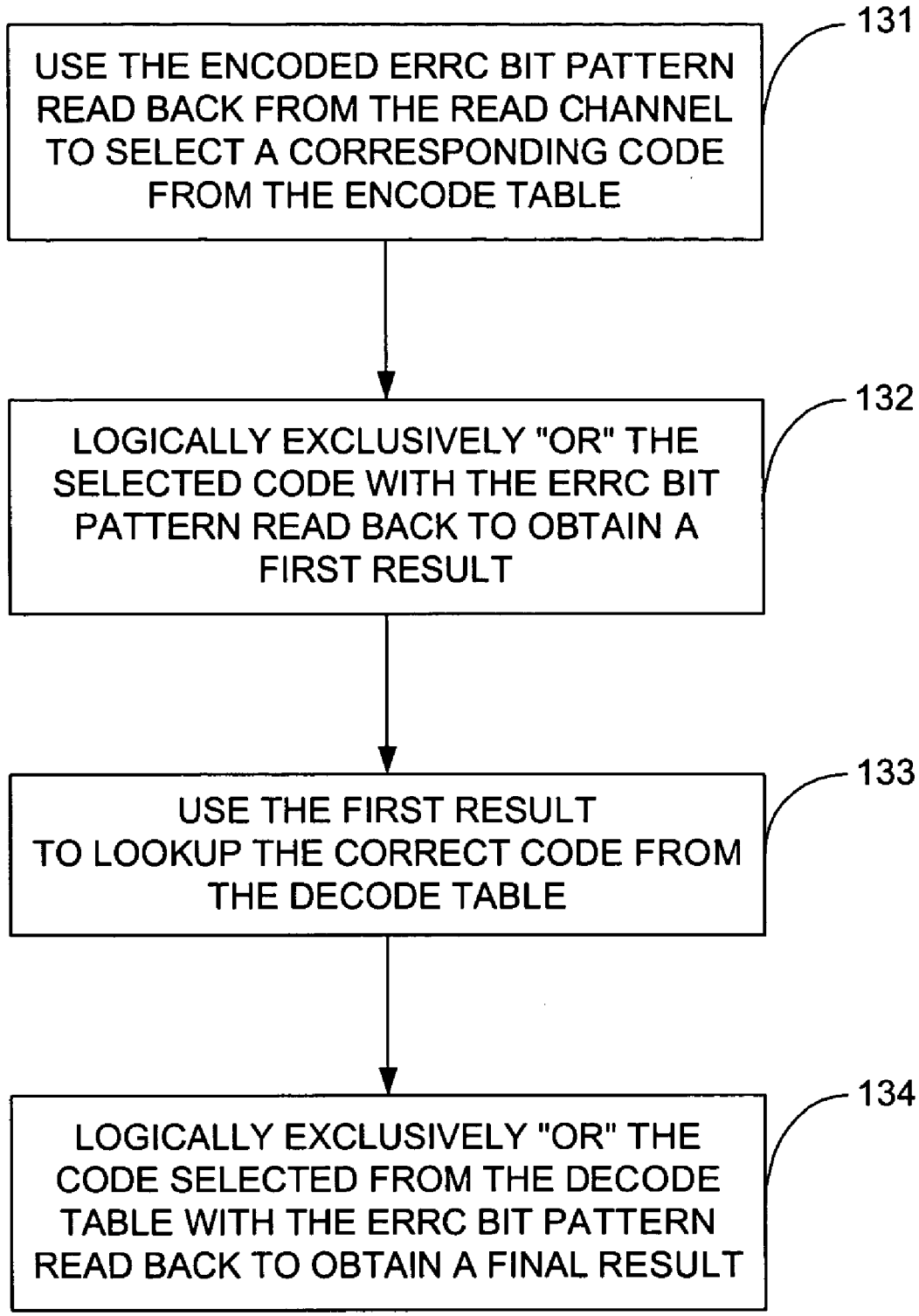
FIG. 4 illustrates a flow chart that represents the method of the invention for decoding an ERRC bit pattern that has been encoded in accordance with the method represented by the flow chart shown in FIG. 3.

FIG. 4 illustrates a flow chart that represents the method of the invention for decoding an ERRC bit pattern that has been encoded in accordance with the invention. The method is performed by executing a decoding algorithm that decodes an encoded ERRC bit pattern read back from a read channel, as indicated by block 130. Like the encoding algorithm, the decoding algorithm may be performed in hardware, software or firmware. Typically, the decoding algorithm is performed in firmware as part of an ISR routine, as indicated above with reference to FIG. 2.

It should be noted that the invention has been described with reference to exemplary embodiments and that the invention is not limited to the embodiments described herein. Modifications made to the embodiments described herein are within the scope of the invention. For example, although the particular exemplary embodiment described above with respect to FIG. 1 described using a four-bit code, the invention is not limited with respect to the length of the code used to encode the ERRC bit pattern. In addition, logical operations other than ORing and exclusive ORing may be used to encode and decode the bit patterns. The logical operations described herein are examples used to demonstrate the principles and concepts of the invention. Other modifications may be made to the embodiments described herein without deviating from the scope of the invention.

What is claimed is:

1. An apparatus for encoding a runout correction bit pattern comprising:
   encoding logic configured to encode a runout correction bit pattern with an error-correcting code comprising one or more code bits, wherein encoding the runout correction bit pattern with the error-correcting code enables one or more bit errors in the bit pattern to be detected when the encoded runout correction bit pattern is subsequently decoded, wherein the code is selected by the encoding logic by using the runout correction bit pattern to be encoded to lookup a code in an encoding table stored in a memory device.

2. The apparatus of claim 1, wherein the code comprises at least four bits.

3. The apparatus of claim 1, wherein the encoding logic encodes a runout correction bit pattern by logically ORing the runout correction bit pattern with the code.

4. The apparatus of claim 1, wherein the encoding logic comprises a processor programmed with software to execute an encoding algorithm that encodes the runout correction bit pattern.

5. The apparatus of claim 1, wherein the encoding logic comprises hardware configured to execute an encoding algorithm that encodes the runout correction bit pattern.

6. The apparatus of claim 1, wherein the encoding logic comprises firmware configured to execute an encoding algorithm that encodes the runout correction bit pattern.

7. An apparatus for decoding a runout correction bit pattern comprising:
   decoding logic configured to receive an encoded runout correction bit pattern read back from a read channel and to decode the encoded runout correction bit pattern, wherein the runout correction bit pattern has been encoded with an error-correcting code comprising one or more code bits, the decoding logic being configured to use the error-correcting code to detect if one or more bits of the decoded runout correction bit pattern is in error, wherein the decoding logic decodes a runout correction bit pattern by:
   logically exclusive ORing (XORing) the runout correction bit pattern read back from the read channel with a code obtained from an encoding table stored in a memory device to produce a first result;
   using the first result to obtain a decoding code contained in a decoding table stored in a memory device; and
   logically exclusive XORing the runout correction bit pattern read back from the read channel with the a code obtained from the decoding table to produce a final result.

8. The apparatus of claim 7, wherein the decoding logic comprises a processor programmed with software to execute a decoding algorithm that decodes the runout correction bit pattern.

9. The apparatus of claim 7, wherein the decoding logic comprises hardware configured to execute a decoding algorithm that decodes the runout correction bit pattern.

10. The apparatus of claim 7, wherein the decoding logic comprises firmware configured to execute a decoding algorithm that decodes the runout correction bit pattern.

11. A method for encoding a runout correction bit pattern comprising:
    performing an encoding algorithm that encodes a runout correction bit pattern with an error-correcting code comprising one or more code bits, wherein encoding the runout correction bit pattern with the error-correcting code enables one or more bit errors in the runout correction bit pattern to be detected when the encoded runout correction bit pattern is subsequently decoded, wherein the code is selected by using the runout correction bit pattern to be encoded to lookup a code in an encoding table stored in a memory device.

12. The method of claim 11, wherein the code comprises at least four bits.

13. A method for decoding a runout correction bit pattern comprising:
    receiving an encoded runout correction bit pattern read back from a read channel, the encoded runout correction bit pattern being encoded with an error-correcting code comprising one or more bits; and
    performing a decoding algorithm that decodes the encoded runout correction bit pattern read back from the read channel and detects whether one or more bits of the runout correction bit pattern are in error, wherein the decoding algorithm decodes the runout correction bit pattern read back from a read channel by:
    logically exclusive ORing (XORing) the runout correction bit pattern read back from the read channel with a code obtained from an encoding table stored in a memory device to produce a first result;
    using the first result to obtain a decoding code contained in a decoding table stored in a memory device; and
    logically exclusive XORing the runout correction bit pattern read back from the read channel with the a code obtained from the decoding table to produce a final result.

14. The method of claim 13, wherein the decoding algorithm is performed as part of an interrupt service request (ISR) routine.

* * * * *